US005498545A

United States Patent [19]

Vestal

[11] Patent Number: 5,498,545

[45] Date of Patent: Mar. 12, 1996

[54] MASS SPECTROMETER SYSTEM AND METHOD FOR MATRIX-ASSISTED LASER DESORPTION MEASUREMENTS

[76] Inventor: Marvin L. Vestal, 7851 Chinon Cir., Houston, Tex. 77071

[21] Appl. No.: 278,405

[22] Filed: Jul. 21, 1994

[51] Int. Cl.[6] .......................... G01N 24/00; G01N 35/02; H01J 49/04

[52] U.S. Cl. .......................... 436/47; 250/288; 250/289; 250/423 P; 250/442.11; 436/173; 436/181

[58] Field of Search .......................... 250/288, 289, 250/423 P, 442.11; 436/47, 173, 181

[56] References Cited

U.S. PATENT DOCUMENTS

| | | | |
|---|---|---|---|
| 4,076,982 | 2/1978 | Ritter et al. | 250/288 |
| 4,296,322 | 10/1981 | Wechsung | 250/423 P X |
| 4,330,208 | 5/1982 | Eloy | 250/288 X |
| 4,405,860 | 9/1983 | Brunnee et al. | 250/289 X |
| 4,620,103 | 10/1986 | Kambara et al. | 250/288 X |
| 4,740,692 | 4/1988 | Yamamoto et al. | 250/423 P X |
| 4,988,879 | 1/1991 | Zave et al. | 250/423 P |
| 5,041,725 | 8/1991 | Izumi | 250/288 X |
| 5,045,694 | 9/1991 | Beavis et al. | 250/287 |
| 5,083,020 | 1/1992 | Takahashi | 250/288 |
| 5,160,840 | 11/1992 | Vestal | 250/282 X |
| 5,288,644 | 2/1994 | Beavis et al. | 250/282 X |
| 5,382,793 | 1/1995 | Weinberger et al. | 250/288 |

OTHER PUBLICATIONS

Article, "Mestastable Decay of Peptides and Proteins in Matrix-Assisted Laser-Desorption Mass Spectrometry", Rapid Communications in Mass Spectrometry, vol. 5, 198–202 (1991).

*Primary Examiner*—Jeffrey R. Snay
*Assistant Examiner*—Arlen Soderquist
*Attorney, Agent, or Firm*—Browning, Bushman, Anderson & Brookhart

[57] ABSTRACT

The system for analyzing multiple samples includes a plurality of portable of sample supports each for accommodating a plurality of samples thereon, and an identification mechanism for identifying each sample location on each of the plurality of sample supports. The mass spectrometer is provided for analyzing each of the plurality of samples when positioned within a sample receiving chamber, and a laser source strikes each sample with a laser pulse to desorb and ionize sample molecules. The support transport mechanism provided for automatically inputting and outputting each of the sample supports from the sample receiving chamber of the mass spectrometer. A vacuum lock chamber receives the sample supports and maintains at least one of the sample supports within a controlled environment while samples on another of the plurality of sample supports are being struck with laser pulses. The computer is provided for recording test data from the mass spectrometer and for controlling the operation of the system.

74 Claims, 5 Drawing Sheets

MASS SPECTROMETER SYSTEM AND METHOD FOR MATRIX-ASSISTED LASER DESORPTION MEASUREMENTS

FIELD OF THE INVENTION

The present invention relates to mass spectrometer systems useful for obtaining matrix-assisted laser desorption measurements. More particularly, this invention is directed to an automated mass spectrometer system for combining high sample throughput with high reliability.

BACKGROUND OF THE INVENTION

Matrix-assisted laser desorption and ionization (MALDI) is a relatively new technique that allows very large molecules, such as DNA fragments and proteins, to be desorbed from a solid sample and ionized without significant decomposition. Coupled with mass spectrometry, this technique allows the molecular weights of biological polymers and other large molecules, including industrial polymers, to be precisely determined. One version of MALDI is described in a 1991 article in *Rapid Communications in Mass Spectrometry*, Vol. 5, Pages 198–202. A mass spectrometer suitable for obtaining highly reliable matrix-assisted laser desorption measurements is described in U.S. Pat. 5,045,694.

Most MALDI applications to date have employed time-of-flight mass spectrometers, although magnetic deflection, Fourier Transform ion cyclotron resonance, and quadrupole ion trap mass analyzers have also been used. A liquid solution of the sample to be analyzed is mixed with a solution containing an appropriate matrix, and a small aliquot of this mixtures is deposited on the source of the mass spectrometer (inside a vacuum system). A vacuum lock is generally utilized to avoid venting the vacuum system. Loading a sample typically requires from one to several minutes, and the attention of a skilled operator. A diligent operator should theoretically be able to load and run a sample every five or ten minutes using such a system, but it is difficult to maintain such a rate over an extended period. U.S. Pat. 5,288,644 discloses one technique for reducing the required time. A plurality of samples are loaded onto the solid surface of a disk, which is rotated by a stepper motor for positioning each sample respectively for striking by a laser beam.

Further improvements in the loading of samples for the laser desorption mass analysis are required for this analytical procedure to gain greater acceptance and significantly increase the use of this analytical tool. The disadvantages of the prior art overcome by the present invention, and an improved system is hereinafter disclosed for obtaining matrix-assisted mass spectrometer measurements. The loading of the samples is highly automated for achieving both high sample throughput and high reliability. The present invention has a wide range of application, and may be used with various analytical methods.

SUMMARY OF THE INVENTION

The present invention provides a highly automated system for preparing, loading, and running samples by MALDI mass spectrometry. Each step in the process may be controlled and monitored by a computer. All sample processing and identification information is recorded along with the mass spectra measurements, so that automated processing of the data may be performed. The typical input to this system is a collection of samples in relatively crude or unprocessed form, and the output provides direct answers to specific questions posed by the scientists relative to the samples. This system is particularly useful in applications that require processing a large number of samples to provide the required data. Examples include DNA sequencing on the scale required by the Human Genome Project, protein sequencing, and determination of the locations and nature of post-translational modifications of proteins.

While there are many potential applications of this invention, the Human Genome Project provides a particularly timely example of the need for this advancement. The DNA that composes the human genome has about 3.5 billion base pairs. Although highly developed techniques for sequencing DNA have been developed, at least a decade would be required using available techniques to accurately sequence even one such DNA. Completion of the genome project will require sequencing thousands or possibly millions of such genomes from both humans and other organisms. The present invention will accordingly be described in detail below with particular emphasis on its application to DNA sequencing, but it should be recognized that it has other applications.

It is an object of this invention to provide improved equipment and techniques for performing MALDI mass spectrometry analysis. The equipment and techniques of this invention substantially reduce both the time and expertise required to load, run, and analyze multiple samples, thereby significantly reducing the cost of the analysis.

A significant feature of this invention relates to the effective combination of mass spectrometry equipment and techniques with matrix-assisted laser desorption ionization equipment and techniques. The equipment and techniques may be utilized to substantially reduce the cost of DNA sequencing. The invention may also be used for determining the molecular weight of various large molecules, such as biological and industrial polymers.

A significant advantage of this invention relates to the reduced time required for mass spectrometry analysis of multiple samples. The invention is particularly well suited for use with a time-of-flight mass spectrometer.

These and further objects, features, and advantages of the present invention will become apparent from the following detailed description, wherein reference is made to the figures in the accompanying drawings.

DETAILED DESCRIPTION OF PREFERRED EMBODIMENTS

The system according to this invention typically involves many components integrated under computer control into a fully automated system. A typical system of ten primary components includes: (1) a sample plate or other sample receiving surface upon which a large number of physically separated and distinguishable samples can be loaded in liquid solution then allowed to dry; (2) identification means for uniquely identifying each sample position and sample plate; (3) an automated system for processing and preparing samples and transferring aliquots to selected sample positions on a sample plate; (4) drying means for storing one or more sample plates in a controlled environment; (5) transferring means for automatically or manually transferring a plurality of sample plates from the controlled environment into the sample receiving chamber of the MALDI mass spectrometer; (6) an automated vacuum lock system for transferring sample plates between the receiving chamber and the ionization source of the MALDI mass spectrometer without significantly increasing the pressure in the mass spectrometer vacuum system; (7) sequencing means for sequentially placing each sample on the sample receiving surface in the path of the laser beam, so that its MALDI spectrum is recorded and stored along with the sample identification information; (8) means for automatically adjusting the laser intensity and sample position relative to the laser beam to obtain MALDI spectra which meet or exceed predetermined criteria; (9) means for automatically calibrating the mass axis of the MALDI mass spectrometer; and (10) means for automatically interpreting the MALDI mass spectra obtained from one or more samples to determine and produce the answer to a specific question. A scientist may thus make inquiry as to the sequence of the bases in a particular DNA fragment, and the system of this invention will rapidly provide the answer in a highly cost-effective manner.

In some applications manual operations may be substituted for the corresponding automated step, but the full power and speed of the invention is realized when operator intervention is required at most, once or twice per day. Each of the ten primary components (and/or corresponding steps) which may comprise an exemplary system is described in more detail below.

1. Sample Receiving Surface

Figure 1:
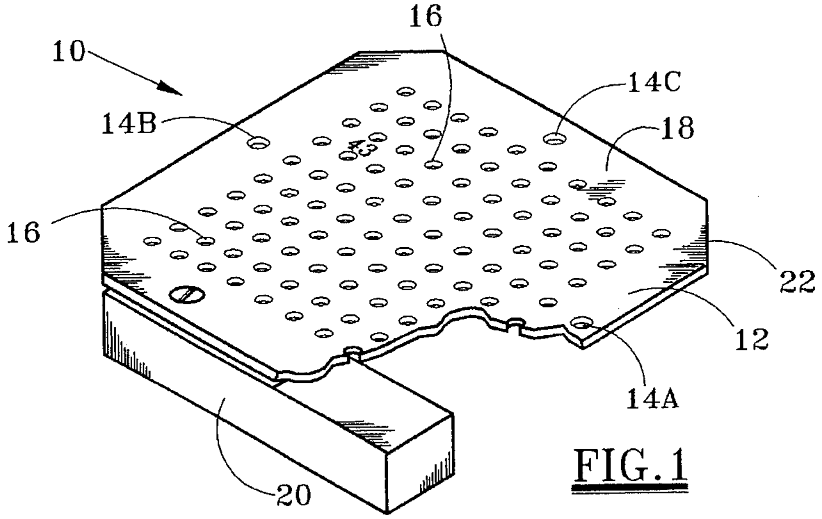
FIG. 1 depicts one embodiment of a sample holder according to the present invention for loading multiple samples for mass analysis.

A preferred embodiment of a sample receiving surface is illustrated in FIG. 1. The depicted sample plate 10 consists of a thin, substantially square plate 12 of stainless steel or other suitable electrically conducting material approximately 1.5 mm thick and 50 mm wide. The plate 10 may contain precisely located holes to allow the position and orientation of the plate to be accurately determined relative to a moveable stage, which is required both in the sample loading step and in the ion source of the mass spectrometer. The sample plate 10 also contains a plurality of precisely determinable sample positions 16 on the upper sample receiving surface 18 of the plate. These sample positions may be determined by a number of photoetched and numbered sample positions or wells as illustrated in FIG. 1. Alternatively, a number of sample positions may be identified by electroplated sample spots and numbers on the surface 18 of the sample plate, with the sample identification providing the row and column number of a respective adjoining sample, i.e., position identification 34 being the sample in the third row and the fourth column of the plurality of samples on the plate 10.

A plate 10 may thus contain 100 sample positions each identified by a sample spot which is about 2.5 mm in diameter in a precisely known location on the plate, with each sample support being suitable for accepting a few microliters of sample solution. Each sample spot may be further identified by a corresponding number similarly plated or etched on the surface 18. Alternatively, the plate may contain a larger number of spots in which photoetched sample wells or photoplated sample spots of appropriate diameter in precisely known locations are prepared on the sample surface without the corresponding sample numbers on the surface. The known sample coordinates thus may be sufficient to identify each sample well or spot. In the case of a 400 sample array (20 rows and 20 columns), 2 mm sample wells or spots have been used successfully. For a 1024 array (32 rows and 32 columns), a 50 mm square plate and 1 mm diameter sample positions have been successfully used. Another alterative is to use a smooth unmodified sample plate in which the x-y coordinates are sufficient to define a unique sample position. The detailed description of the invention discussed below utilizes 50 mm plates with square arrays of sample positions which can accommodate up to 1024 distinguishable sample positions. Any distribution of samples over a surface, either known or unknown, can be accommodated. Sample plates of a variety of geometries could be used, including circular, rectangular, and regular and irregular polygons. The maximum size of the sample plate is limited only by the size of the ion source vacuum chamber and travel limits of the x-y table on which the sample receiving stage is mounted. It should be understood that smaller or larger numbers of distinguishable sample positions may thus be defined on sample receiving surfaces of other geometries.

In a preferred embodiment as illustrated in FIG. 1, a ferromagnetic material handle 20 is attached along one edge of the plate on the bottom side, i.e., the side opposite the receiving surface for the samples. This handle 20 may have a rectilinear cross-sectional configuration, and is used to engage an electromagnetic device for the purpose of transporting the sample plate between component systems.

The sample plate 10 has beveled comers 22 yet provides a total square surface having 50 mm sides interior of the beveled comers on the top surface of the plate 10 for receiving multiple samples. Samples may be deposited on this plate in a variety of ways, and for explanation purposes it may be assumed that an array of circular spots 16 is photoetched into the plate 10 along with identifying numbers. This arrangement easily accommodates up to 1024 sample spots each 1 mm in diameter in a 32×32 array without identifying numbers. Each of these 1024 sample spots will accommodate about 100 nanoliters of sample solution.

Figure 2:
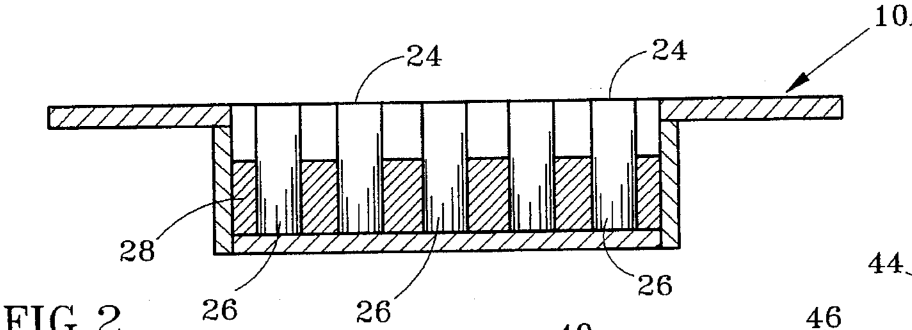
FIG. 2 depicts an alternate embodiment of suitable apparatus for loading multiple samples for mass analysis.

As shown in FIG. 2, the samples alternatively may be deposited on the ends 24 of removable pins 26, and the pins locked into a two dimensional array using a sample holder positioned on a sample plate 10A. A suitable holder 28 may have a rectangular horizontal cross-section, and may be sized to receive a 5×5 array of vertical pins. Samples of interest are thus deposited in known locations or spots on the surface of the sample holder. In other cases, the locations of samples of interest may not be of particular significance. For example, a system may be employed with samples deposited by blotting from a two-dimensional gel, in which case samples of interest may be distributed in an unknown pattern over the sample surface.

As shown in FIG. 1, the sample plate 10 has two or more precisely located holes 14A, 14B and 14C each located near an edge of the plate 10. These holes 14 locate the sample holder when installed in the sample receiving stage in the ion source of the mass spectrometer and in the sample transport trays. The magnetic material bar 20 may be engaged by an energized electromagnet (not shown) to assist in transporting the sample holder into the sample receiving stage, as discussed subsequently.

2. Identification of Sample Position and Plate

The x-y coordinate of each sample position on one side (typically the top side) of the sample plate may be used to determine a unique sample position on each sample plate. The diameter of a sample spot centered on each position may be used to further define a sample position. The minimum data required to uniquely identify a sample position is the x-y coordinate and the diameter of the spot. As discussed above, the sample position may be further defined by a photoetched well or photoplated spot centered at the corresponding x-y coordinate on the sample plate, and may be even further defined by the corresponding number etched or plated near the corresponding sample spot.

Each particular sample plate may be identified by a serial number etched into the top surface of the plate or attached to or etched into the bottom surface of the plate. A computer readable bar code may be used with a sufficient number of digits to uniquely identify the sample plate relative to any other which might be encountered within a series of similar runs. The systems involved in applying the samples to the sample plates and those for loading the plates into the mass spectrometer as discussed below may also be equipped with bar code readers to provide the required identification of the sample plates.

3. Processing and Preparing Samples

The details of this component will depend on the application, the types of samples to be tested, and the degree to which the samples are prepared and purified prior to being input to the analysis system described below. The following discussion sets forth the representative steps required to carry out an automated MALDI analysis. It should be appreciated that additional automated sample preparation and purification steps could be added. Rate-determining steps may be used, for example, to determine the speed with which the complete determination can be done.

The invention is particularly suited for DNA sequencing. For this purpose, it is assumed that a set of sequencing mixtures has been prepared off-line using either the Maxxam-Gilbert or Sanger method. The mixtures may be presented to the system in the form of liquid solutions in small vials or tubes in a tray which may be accessed by an autosampler. Substantially the same samples in the same form may be presented for separation by electrophoresis in conventional DNA sequencing.

Figure 3:
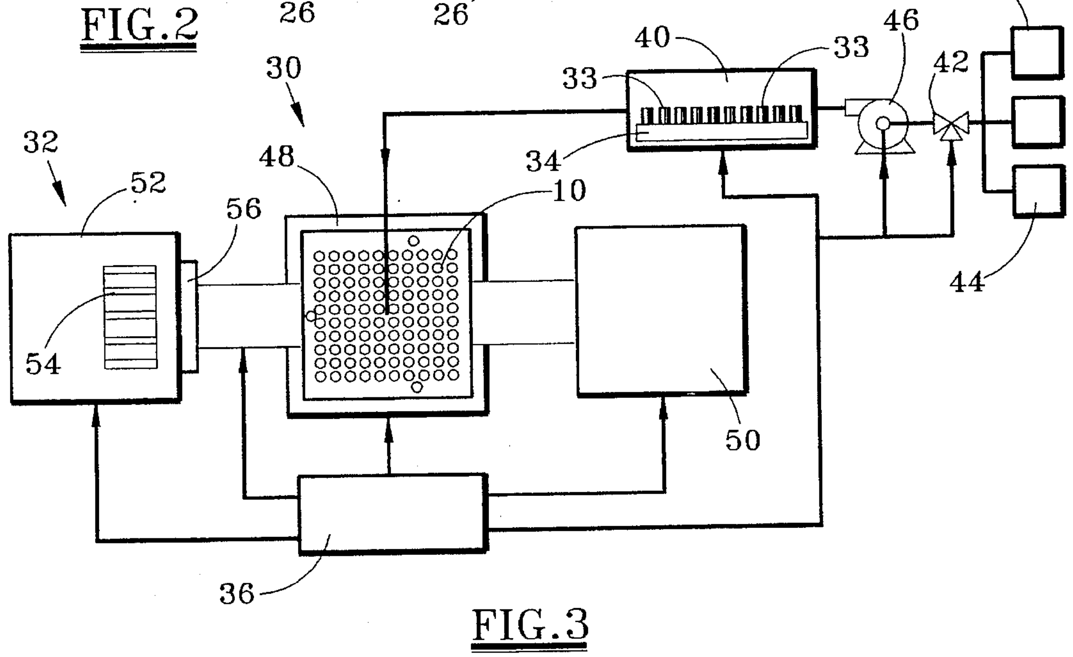
FIG. 3 is a block diagram of an automated system for processing and preparing samples, and for transferring multiple sample aliquots on a sample plate to selected sample positions.

With reference to FIG. 3, the sample processing components include an autosampler 40, valve means 42 for controllably adding an appropriate solution of matrix from containers 44 to each sample, and a pump or other flow system 46 for transferring liquid samples from a selected sample to a known sample position on the sample plate. The sample plate is precisely located on a holder mounted on a computer-controlled x-y table 48. Each sample position may be computer recorded at the time the sample aliquot is transferred to the plate. The autosampler may be similar to autosamplers used with capillary electrophoresis.

FIG. 3 illustrates one embodiment of a suitable system 30 for preparing and processing samples. Samples are presented to the system in standard sample vials, such as small plastic Eppendorf tubes 33. A large number of samples tubes may be accommodated within a sample input tray 34. The person providing the samples enters sample ID information in computer 36, selects the dilutions and matrixes required, and sets the internal standards and relative concentrations, if required, for each sample. The system prepares the requested sample dilutions and matrix and standard additions, and transfers each sample aliquot to a known position on the sample plate 10 discussed above. The computer 36 generates a data file containing sample ID, dilution, matrix, and internal standard (if any) for each position on the sample plate. The sample plate from transporter 50 is capable of automatically changing the sample plate when it is filled, and transporting the filled sample plate to a cassette 54 for sample drying and storage. Each plate is identified with a bar code and both the sample preparation system and the MALDI instrument are equipped with bar code readers for automatic sample tracking. Individual sample plates or cassettes containing up to 20 sample plates may be transferred along with the sample data to the MALDI instrument for analysis. The computer controlling the sample preparation system is networked with the computer (shown in FIG. 8) controlling the mass spectrometer, so that both sample information and mass spectral data may be exchanged between the two computers. The samples accordingly may be prepared in one laboratory and the data processed there, even if the MALDI instrument is in a different location. This feature also allows multiple sample processing and loading stations to be used with a single mass spectrometer.

4. Drying and Storing Sample Plates

When each sample location on a plate has been loaded with a sample, the samples are allowed to dry before the plate is transferred into the vacuum chamber of the mass spectrometer. In the simplest case, the plates may be transferred from the sample loading system to a rack or cassette where they are allowed to dry in laboratory air. In the preferred embodiment, however, this rack or cassette 54 is located inside a sealed chamber 52 equipped with a computer-controlled door 56 which allows the samples to be dried in an environment in which the pressure, temperature, and composition of the surrounding atmosphere is controlled. In the fully automated mode, each of the loaded and dried sample plates may be transferred from the sample plate storage chamber 52 to an adjacent mass spectrometer. Alternatively, the samples may be prepared and loaded off-line onto the sample plates. When a sufficient number of sample plates has been loaded with samples, the plurality of sample plates may be transferred manually to the mass spectrometer and loaded as a complete cassette using the manually operated sample loading door.

5. Transferring Sample Plates into the Mass Spectrometer Sample Receiving Chamber The manual step involved in loading the sample plates may be eliminated by adding a sample storage region to the vacuum lock chamber of a mass spectrometer, as shown schematically in FIGS. 4 and 5. This provision, when coupled with on-line sample loading, allows the system to be operated in a fully automatic, unattended mode. In this configuration, an input door 58 is located between the vacuum lock chamber 68 and the storage chamber 60. An air cylinder transporter 89 equipped with electromagnets is provided for transporting sample plates 10 from the transport tray 80 within the storage chamber 60 to the vacuum lock chamber 68. The tray or cassette 80 contains multiple shelves and corresponding slots each for storing a sample plate. A cassette transport drive mechanism including a lead screw 64 driven by a stepper motor 66 is provided to allow any selected one of these slots and a corresponding plate 10 in the cassette 80 to be brought into line with transporter 89.

Figure 4:
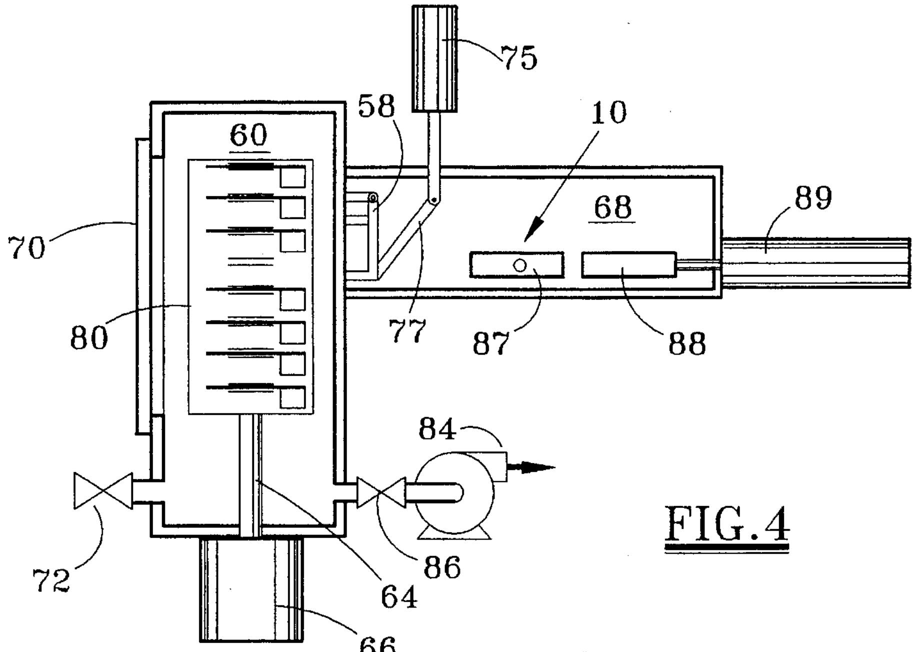
FIG. 4 is a top view of a suitable system for automatically transferring sample plates between a sample storage chamber and an ion source chamber of a mass spectrometer.
Figure 5:
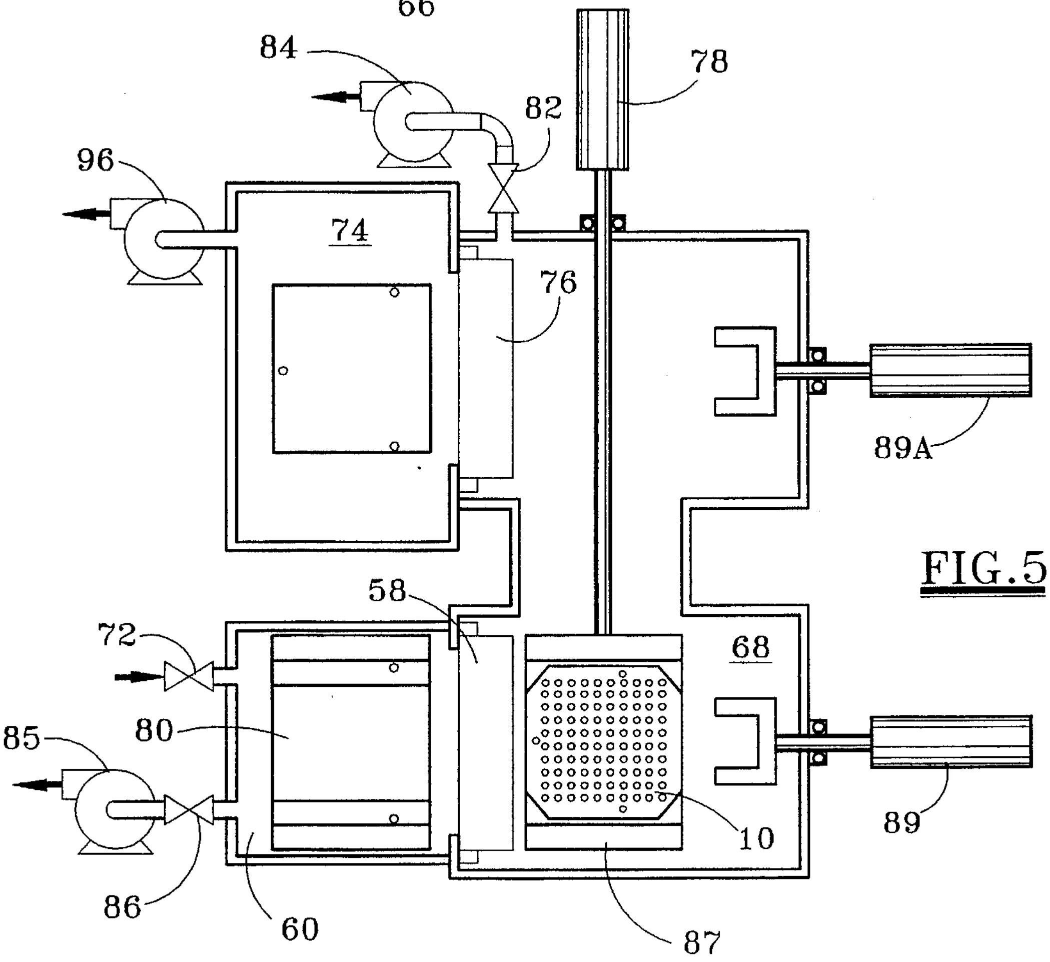
FIG. 5 is a front view of the system shown in FIG. 4.

The system as shown in FIGS. 4 and 5 allows sample plates 10 to be loaded into the storage region of the vacuum lock chamber 68, while another sample plate 10 is being analyzed in the ion source chamber 74 of a mass spectrometer. In fully automatic operation, whenever a new sample plate 10 may be loaded, the storage chamber 60 is evacuated, the input door 58 between the storage chamber 60 and the vacuum lock chamber 68 is opened, and the new sample plate is automatically moved by transporter 89 to a sample transport tray 87 provided in the vacuum lock chamber 68. The input door 58 is then closed and the vacuum lock chamber 68 remains evacuated. The plate 10 positioned by sample transport tray 87 is moved within chamber 68 by an air cylinder transport mechanism 78.

When analysis of the samples on one plate 10 within the ion source is completed, the plate 10 is ejected and placed in a vacant slot in the sample storage cassette 80. This cassette 80 is then moved by stepper motor 66 and lead screw 64 to bring a new sample plate in the transport tray 80 in line with the transporter 89, and the new sample plate is loaded. The exchange of samples may thus be accomplished without venting of the vacuum lock chamber 68, which was evacuated during the time that the samples on the previous plate were being analyzed. This allows sample plates to be changed very quickly (at most a few seconds) while maintaining the ion source at high vacuum.

The sample storage chamber 60 is equipped with a manually operated door 70 through which a number of sample plates loaded with samples off-line can be introduced simultaneously. To load a set of samples, a "manual load" setting is selected on the computer 36. This causes the sample storage chamber 60 to be vented to atmosphere via vent valve 72, and allows the manual load door 70 to be opened. The samples are then loaded and the chamber evacuated. The entire set of sample plates can now be analyzed automatically without further operator intervention.

6. Automated Vacuum Lock System

The vacuum lock chamber 68 is equipped with computer controlled valves and mechanical transport devices which allow the sample plates 10 to be transported under computer control from the sample storage chamber 60 (which may be at atmospheric pressure) to the sample receiving stage within the evacuated ion source chamber 74 of a mass spectrometer, without venting the evacuated chamber 74. The vacuum lock chamber 68 has an input port which may be opened or closed by door 58 and through which sample plates are loaded from the sample storage chamber 60 into the vacuum lock chamber 68. An output port through which a sample plate is transported from the vacuum lock chamber 68 to the ion source vacuum chamber 74 is similarly opened and closed by output door 76. Each door includes an "O" ring seal and may be opened and closed by a respective air cylinder 75 controlled from the computer 107.

A preferred embodiment of the vacuum lock chamber 68 is depicted in FIG. 5 with its associated valves and transporters suitable for fully automated operation. A cassette 80 containing a number (typically 20) loaded sample plates 10 may be transferred from either an off-line sample storage chamber or a sample storage chamber 60 attached to the vacuum lock chamber and thus the mass spectrometer. Before loading a sample plate 10 into the storage chamber 60 for subsequent analysis by the mass spectrometer, it may be assumed that the sample loading doors 58 and 76 are closed, the vent valve 72 is closed, and the pumpout valve 82 connecting the mechanical vacuum pump 85 with the vacuum lock chamber 68 is closed. The pumpout valve 86 connecting the mechanical vacuum pump 85 with the storage chamber 60 is first opened, thus evacuating the sample storage chamber. When the residual pressure in this chamber 60 has reached a predetermined acceptable vacuum level (e.g., 20 millitorr), the valve 82 is opened, and the input and output doors 58 and 76 are opened, allowing sample plates to be transported between the sample storage chamber 60 and the ion source chamber 74 of the mass spectrometer without significantly degrading the vacuum of the mass spectrometer. A conventional vacuum pump 96 is provided for maintaining the chamber 74 at a desired pressure. Once transport of a plate 10 is complete, the doors 58 and 76 may be closed by computer control. The fully automatic operation of the vacuum lock involves the cycle steps which begin with completing the measurements on the previous sample plate, and end with beginning the measurements on the next sample.

Figure 6:
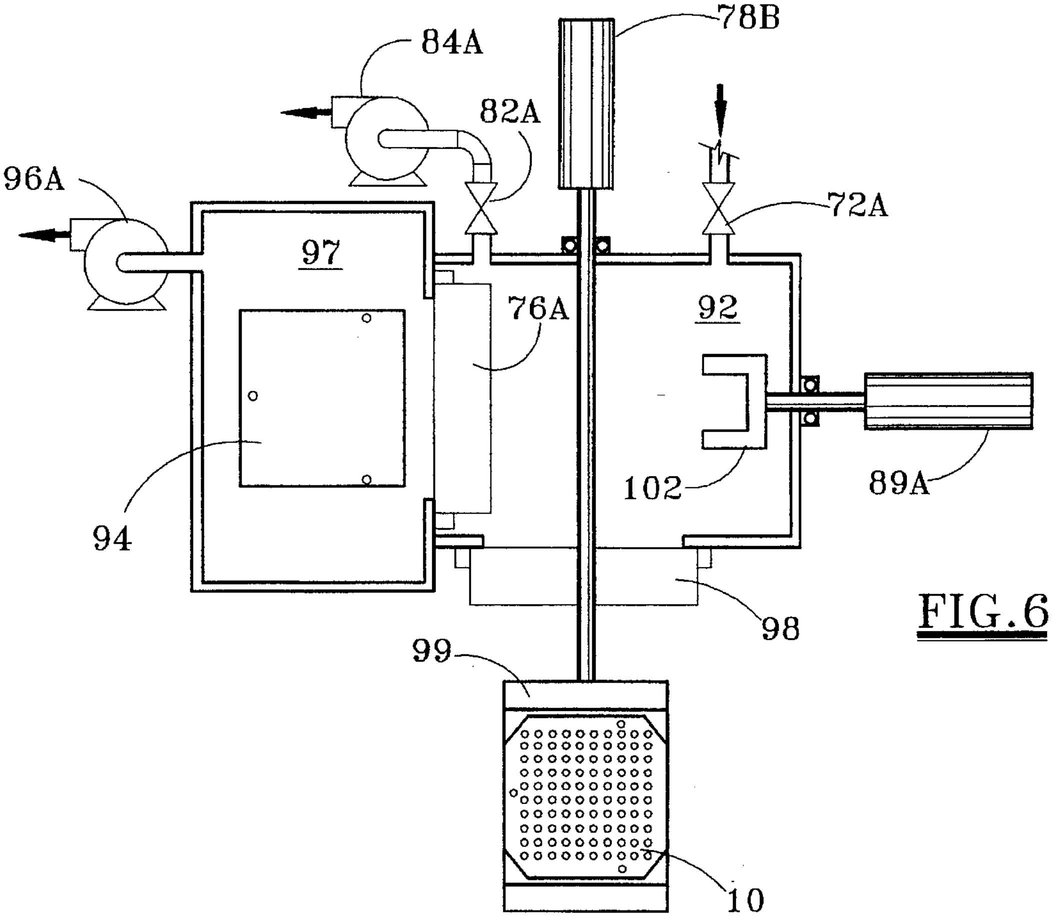
FIG. 6 is a top view of a simplified vacuum lock assembly prior to loading a sample plate into the vacuum lock chamber.
Figure 7:
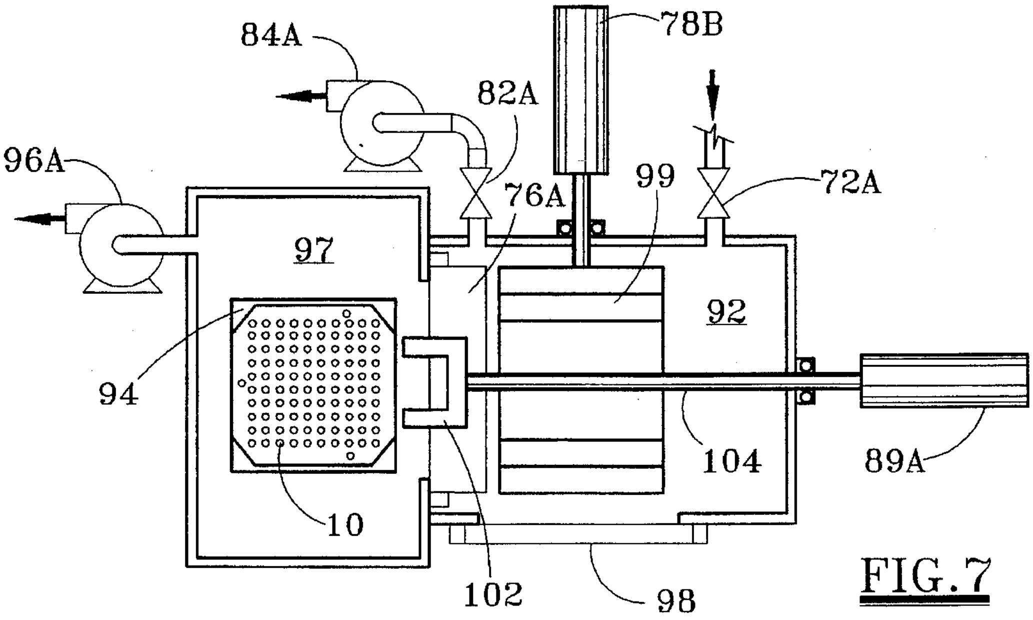
FIG. 7 is a top view of the simplified vacuum lock assembly as shown in FIG. 6 after loading the sample plate into the analysis chamber.

A simplified version of the vacuum lock designed for use with remote sample storage chamber is shown schematically in FIGS. 6 and 7. This system is suitable for manually loading individual sample plates into the mass spectrometer without venting the mass spectrometer vacuum system. Prior to loading a sample plate, it may be assumed that the output door 76A is closed, and the pumpout valve 82A is closed. The vent valve 72A is opened allowing the pressure in vacuum lock chamber 92 to be raised to that of the surrounding atmosphere while the vacuum pump 96A attached to the ion source chamber 97 maintains the ion source chamber under high vacuum. The input door 98 is then opened and the sample transport tray 99 is transported by its air cylinder 78B through the input door 98 to a point where it is accessible for loading. The sample plates 10 may be manually loaded into the sample transport tray 99. Under computer control following a command from the operator, the tray 99 containing a sample plate is retracted into the vacuum lock chamber 92 by air cylinder 78B, and the input door 98 is then closed. The vent valve 72A is then closed, and the pumpout valve 82A is opened and the pump 84A activated until the vacuum lock chamber 92 is sufficiently evacuated. When a satisfactory pressure has been reached (typically 50 milliliter), the output door 76A is opened.

With reference now to FIG. 7, the sample plate 10 is then transported from the transport tray 99 to the sample receiving stage, i.e., the ion source chamber 97, of the mass spectrometer. This transport is accomplished by energizing a small electromagnet 102 attached to the actuator rod 104 of the air cylinder 89A. When energized, this electromagnet 102 engages the strip of magnetic material 20 attached to the sample plate 10 and firmly holds the plate 10 until the magnet is de-energized. After the sample is in place in the sample receiving stage 94 of the mass spectrometer, the magnet 102 is de-energized and the transporter cylinder 89A is retracted, leaving the sample plate 10 in the chamber 97. The output door 76A is then closed and the mass spectrometer is ready for testing the new samples on plate 10. The complete loading operation takes less than one minute, and very little gas is introduced into the ion source vacuum chamber during this operation.

To eject the sample plate and load a new one the process is reversed. First the output door 76A is opened, and the transport cylinder 89A equipped with the electromagnet 102 is extended so that the electromagnet makes contact with the magnetic strip on the sample plate 10. The electromagnet is energized and the cylinder 89A retracted to move the sample plate from the ion source chamber 97 to the transport tray 99 in the vacuum lock chamber 92. The output door 76A is closed, the magnet 102 is de-energized, the input door 98 is opened, and the sample tray 99 extended so that the old sample plate can be removed by the operator and replaced with a new sample plate. Except for this final step, the entire operation is accomplished entirely under control of computer 107 with no intervention from the operator except for selecting a "eject" setting on the computer to remove a sample, and an "operate" setting to load a new sample and begin the test.

Figure 8:
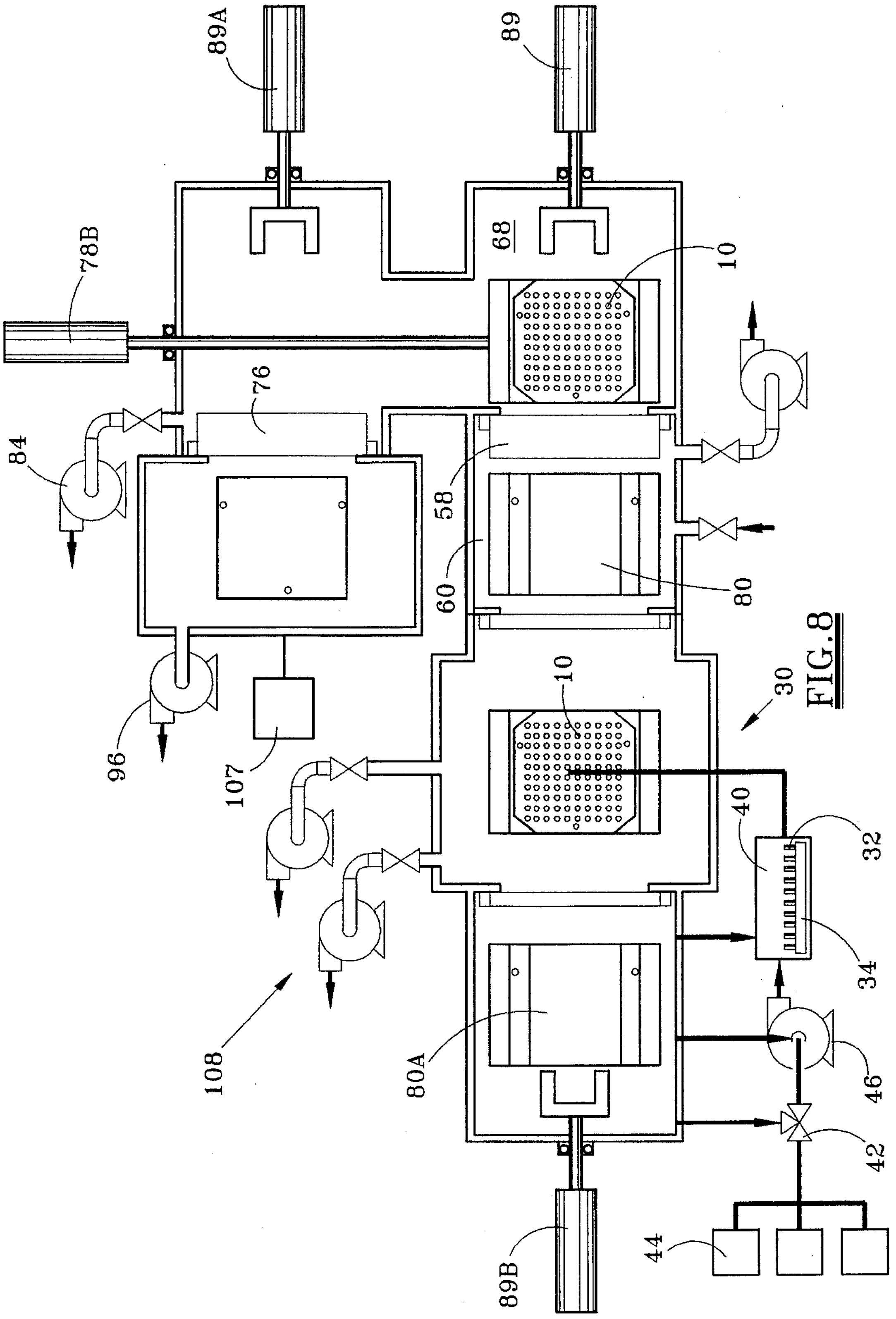
FIG. 8 is a schematic diagram of a fully automated system according to the present invention.

Operation of the fully automated system shown in FIGS. 4 and 5 is thus similar to the system shown in FIGS. 6 and 7 except that operator intervention is minimized in the FIG. 4 system. A preferred system according to this invention combines the features of the systems discussed above. FIG. 8 discloses a system 108 for analyzing a plurality of samples and includes an additional electromagnetic transporter 89B which transports sample plates from cassette 80A containing vacant sample plates 10 to the sample loading system 30. After loading, the sample plates 10 are transported by transporter 89B to the sample storage chamber 60. The cassettes discussed above may each hold up to 20 sample plates in a vertical stack. The cassette 80 which supplies plates 10 to the ion source chamber has at least one empty slot when a sample plate is being tested in the ion source chamber 74. The position of this cassette in the storage chamber may be controlled by a computer driven stepper motor as described above so that any selected slot in the storage cassette can be brought into the plane defined by the respective sample plate transporter 89. A tested sample plate may be transported from ion source chamber to a vacant slot in the cassette within the vacuum lock chamber, and the sample cassette indexed to position another sample plate for transport from the vacuum lock chamber to the ion source chamber, then the sample door closed and the new samples on the new plate tested. While the mass spectrometer is testing one sample plate, new samples may be manually or automatically loaded and/or tested using sample plates removed without interfering with the mass spectrometer or it vacuum system. Computer 107 controls the mass spectrometer and the position of the system components described above.

7. Sequentially Testing Loaded Sample Plates

Figure 9:
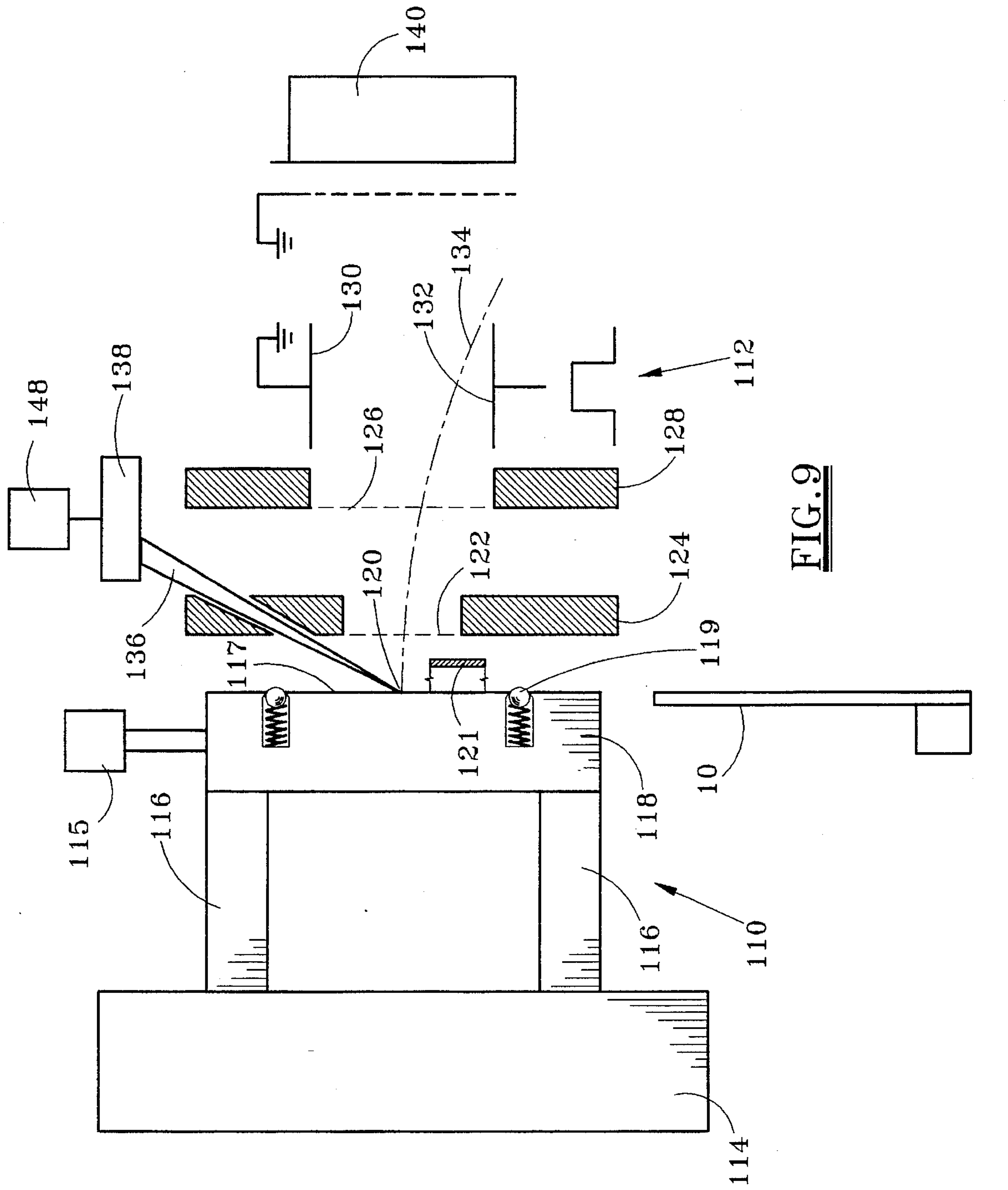
FIG. 9 is a schematic illustration of a matrix-assisted laser desorption ion source combined with a simplified representation of a mass spectrometer according to the present invention.

A preferred embodiment of the ion source 110 and a MALDI mass spectrometer 112 is depicted in FIG. 9. A stainless steel block 118 is rigidly mounted to an x-y table 114 via electrically insulating posts 116 made of ceramic or polyamide. The block 118 and table 114 may be positioned within the ion source chamber 74 (or 97) discussed above. An electrical potential of up to approximately 30 kV, positive or negative, may be applied to block 118 by a connection to an external power supply 115. The x-y position of the block 118 is controlled by one or more stepper motor driven micrometer screws (not shown) conventionally used with x-y tables. The block 118 is equipped with standard lip-type guide plates 121 to assist in transporting the sample plate 10 into position on the face 117 of block 118. Conventional securing members, such as spring loaded balls 119 may be used to cooperate with the holes 14 in the plate 10 to lock the sample plate into position with respect to the block 118.

With computer control of the stepper motors, this system allows any selected point on the sample plate to be positioned precisely (typically within one thousandth of an inch) on the optic axis of the mass spectrometer where it is irradiated by the laser beam 136. Beam 136 strikes a sample on plate 10 at point 120 within plane 117, resulting in ion beam 134. Accordingly ions may be produced from each sample on the plate 10, which is moved automatically by the x-y table 114 between sample positions with respect to the laser beam.

The remaining components of a suitable time-of-flight mass spectrometer 112 as shown in FIG. 9 include a metal plate 124 having a grid hole 122 therein, and a metal plate 128 having a grid hole 126 therein. The metal plate 128 may be maintained at ground potential and voltages applied to block 118 and plate 124 may be varied to set the accelerating electrical potential desired, which is typically in the range from 15,000 to 50,000 volts. A suitable voltage potential between block 118 and plate 124 is 10,000 volts, and a suitable voltage potential between plate 124 and plate 128 is from 10,000 to 40,000 volts.

Most of the low weight ions are prevented from reaching the detector 140 by deflection plates 130 and 132, which may be spaced 1 cm. apart. Plate 130 may be a ground potential. Plate 132 receives a square wave pulse timed as a function of the laser beam striking a particular sample. Each pulse thus suppresses low mass ions, so that substantially only desired ions reach the detector 140. Other details with respect to a suitable spectrometer are disclosed in U.S. Pat. Nos. 5,045,694 and 5,160,840.

8. Automatically Adjusting Laser Intensity and Sample Position

In MALDI, the intensity and quality of the mass spectra generated is strongly dependent on the intensity of the plume of ionized and neutral material that is produced by the incident laser pulse impinging on the sample and matrix. This intensity depends on the laser intensity, the composition of the matrix used, and details of the crystalline structure of the matrix and sample on the surface. While it is possible to establish a narrow range of laser intensities which produce acceptable spectra, one typically cannot predict with the desired precision the laser intensity which will yield the best results on a particular sample. In general, if the laser intensity is too high, the signal-to-noise ratio may be excellent, but the mass resolution and mass accuracy is degraded. Conversely, if the laser intensity is too low, the mass resolution and accuracy are satisfactory, but the signal level is low and signal-to-noise ratio is poor. Also, the surfaces of multiple samples on a plate tend to be non-uniform, so that some locations yield excellent results and others do not. Under manual control of the laser beam and sample position, it is possible through a process of trial and error to find a combination of laser intensity and sample position which provides excellent results.

An automatic control used according to this invention closely mirrors what is generally the most successful strategy when operating manually. The intensity of the beam output 136 from the laser source 148 is increased until the ion signal suddenly appears at a relatively high setting. At this point, signal-to-noise is excellent, but resolution is poor. As the laser intensity is decreased, the signal may actually increase at first (sometimes going into saturation), but at some lower intensity the signal is decreased, and the resolution is dramatically increased. With an improved attenuator 138, this hysteresis appears to be entirely related to changes in the sample properties, and is not due to hysteresis in the attenuator. The upper and lower values for these events are very reasonably reproducible and appear to depend primarily on the particular matrix used, and only weakly on the sample preparation, source voltage, or other parameters.

The strategy for exploiting these observations in the automatic mode follows. The upper and lower limits in the acquisition set-up menu and the laser step size are established. Two choices are provided for the number of spectra to be averaged: an upper number and a lower number. The upper number of spectra are averaged when the laser beam 136 is at its maximum intensity, and the lower number is used at all other laser intensities.

When a new sample is selected by the autosampler menu, the acquisition starts with the laser beam 136 set at the upper limit. The number of spectra requested is averaged. If a spectrum acquired contains intensity within the desired mass and intensity limits set, the spectrum is saved and calibrated using the upper calibration file associated with this set-up file. If the spectrum acquired is too intense, i.e., the maximum intensity within the mass window is greater than the upper intensity level (typically set just below saturation), the laser intensity is decreased by one increment and the process repeated until a spectrum meeting the selection criteria is obtained or the lower limit is reached. If the spectrum is too weak, i.e., the maximum intensity within the mass window is too weak, the sample is incremented to a new spot and the process is repeated. If a spectrum is obtained which has intensity within the chosen limits at any laser intensity other than the lower limit, that spectrum is saved as an upper intensity spectrum and the upper calibration file associated with the acquisition set-up file is used. If an acceptable spectrum is obtained at the lower limit of laser intensity, that spectrum is saved as a lower intensity spectrum and the lower calibration file associated with the acquisition set-up file is used. If both an upper and a lower intensity spectrum are obtained on the selected sample spot, the acquisition proceeds to the next sample. If only one of these is obtained, or neither one, the sample is incremented to a new spot until both an upper and a lower spectrum have been saved, or until the range of possible sample spots has been exhausted.

9. Automatically Calibrating the Mass Axis

During automatic operation of the MALDI instrument, an automatic procedure may be used for checking the calibration of and recalibrating the mass scale to maintain the desired mass accuracy. This can be accomplished by loading a sample plate containing one or more known samples so that the known mass spectrum can be used to automatically check and correct the mass scale as necessary.

The procedure for calibrating the mass axis is described below. Each acquisition set-up file must have both an upper and a lower calibration file associated with it. These files may be chosen from a list of files already in existence by the operator preparing the set-up file, or may be generated using the "calibrate" selection in the set-up file for calibration based on a selected known sample. Each calibration file which is saved may have all of the parameters associated with its generation saved, so that in the event the operator chooses a calibration file which employs different parameter values, a warning is given and the acquisition set-up file corresponding to the one that was used may be displayed with the parameters highlighted that are different from those which have been selected in the new acquisition set-up. The operator has the option of approving the chosen calibration file which is then associated with the new set-up file, even if some parameters are different. Alternatively, the operator may reject the chosen calibration file, return to the set-up file, and either choose a different calibration file or generate a new one. If a new calibration file is generated using a particular set-up file, a "check replace" selection may be employed to determine if the file is to replace a pre-existing calibration file. A new designation for upper or lower calibration numbers is also an option.

In addition to the above changes in the manual calibration procedure, an automatic calibration mode may be used. Particular samples on the sample plate may be identified as calibration samples, and the calibration compound selected from a list. For each sample or calibration compound, the matrix from a list may be selected. For each calibration compound and matrix combination chosen, a list of masses and laser intensities may be stored. The normally used mass and intensity valves may be entered as an initial equipment set-up. A service technician will be able to alter initial factory data at the location of the customer.

During automatic calibration, the procedure for acquiring the calibration spectrum is the same as for acquiring data from a sample. If the calibration designation is selected in the autosampler set-up, that sample is treated as a calibration sample and the spectrum obtained is compared to that expected from the reference file. If peaks are found within the default values of mass and intensity (typically set by the service technician), the calibration file for the particular acquisition set-up and laser intensity being used is recomputed, and the old file replaced by the new file. If the observed spectrum falls outside the default limits, a warning message is momentarily displayed and then stored for later display when the data are processed. If the attempted calibration does not succeed, the old value is retained, and automatic acquisition proceeds. For instrument service purposes, it may be desirable to retain the old calibration files in a directory accessible to the service technician.

To implement the above, columns may be added to the autosampler set-up menu. These columns might include a choice of sample or calibrant, a choice of matrices from a pull-down list, and a pull-down menu showing the list of known calibrants. The operator may also enter new parameters characterizing a new calibrant within another column. The operator may also have the option of designating a matrix choice in the acquisition set-up file.

10. Automatically Interpreting the MALDI Mass Spectra

Mass spectra interpretation depend on the type of samples analyzed and the information required. The first step is to convert the observed time-of-flight spectrum into a mass spectrum, i.e., a table of masses and intensities for all of the peaks observed in the time-of-flight spectra. Peaks that are known to be due to the matrix or other extraneous material will normally be deleted from this list. This mass spectrum is obtained by calculating the centroid and integral intensity of each peak. The peak width may also be included (e.g., full width at half maximum) to provide a measure of the maximum uncertainty in the mass determination.

In the application to DNA sequencing, each set of four samples consists of one sample ending, so that all possible fragments ending in a specific base are included in each sample set. Accordingly, for each DNA fragment to be sequenced, there is a sample with all possible fragments terminating in C, T, A, and G, respectively. Each of these fragments is observed as a peak in the time-of-flight spectrum of that sample. By superimposing the four spectra, the sequence of bases can be read directly. Furthermore, the mass difference between any pair of peaks in these four spectra must correspond to the total mass associated with the nucleotides in that portion of the sequence. This provides a significant redundancy in the results, which may be useful for analysis other than that involving the simple ordering of the peaks, a feature which is not available in electrophoresis. If a peak is very weak and is missed, or if two peaks are insufficiently resolved, a base may be missed by simple ordering. The mass difference observed between the next pair of adjacent peaks will thus show the error and allow correction. The computer may thus interpret the spectra and directly produce the sequence of bases in the DNA fragment. If there are any regions of the spectrum where the results may be consider ambiguous or unreliable, e.g., because the observed mass differences are inconsistent, those regions may be flagged so that the operator may perform either manual study or further automated analysis on those regions.

According to the technique of this invention a MALDI mass spectrometer is used rather than electrophoresis separation for DNA sequencing. Until recently, the MALDI technique was limited to single-stranded DNA fragments up to about 50 bases in length, but the range has now been extended to fragments as large as 500 bases in length.

Conventional large-scale sequencing is currently being done at a rate approaching 1 Mb per year of finished sequence. The cost of sequencing is in the vicinity of one U.S. dollar per base. A rate of 500 Mb per year is required for the Human Genome Project. A price of 20 cents per finished base is commensurate with the budget and goals of this project.

At the present stage of development, MALDI analysis of DNA fragments can be done readily on mixtures containing components less than 50 bases in length. Recent work suggests that this fragment length can be extended, perhaps as much as one order of magnitude to fragments 500 bases in length. Large scale sequencing would proceed much more rapidly by this technique if the fragments analyzed could be extended significantly. A reasonable goal is to be able to accurately analyze mixtures containing oligimers up to 300 bases in length. The resolution and sensitivity of presently available instruments is satisfactory. Even with the limitations imposed by the short segments, the MALDI technique with application of the present invention could be competitive with conventional approaches.

The present invention can readily handle at least 4 samples per minute, which corresponds with 50 base fragments to 50 bases of raw data per minute, since 4 separate samples are required to sequence each segment. A single instrument can run at least 1200 minutes per day to provide 60,000 bases per day of raw sequence. This is about 22 Mb/year from a single instrument. This is raw data, however, and the piecing together of fragments from short sequence generated data is likely to require considerable redundancy. Nevertheless, a single instrument, even with the limitations imposed by short segments, can surpass the total output of present conventional sequencing. The price for this instrument is about $200,000, and it should have a useful life of at least 5 years. Total cost for operating and maintaining the instrument (including amortization) should be less than $100,000/year. If the instrument produces 2 Mb of finished sequence/year, this corresponds to 5 cents/base. 250 such instruments would be required to provide sequences at the rate required by the Human Genome Project. If the length of the fragments analyzed can be extended, the speed will increase and the cost will rapidly decrease since less redundancy will be required. If the fragment length was increased to 300 bases, the raw data rate increases proportionally to about 120 Mb/year. The ratio of this raw rate to finished data rate should improve dramatically and may approach 50 Mb/year for a single instrument. In this case, ten instruments could provide the rate required by the Human Genome Project at a cost of 0.2 cent per base. Although this rate would not include the cost of sample preparation and data analysis, the rate and cost of raw sequence determination would no longer be the limiting feature.

It should be understood that this invention has been disclosed so that one skilled in the art may appreciate its features and advantages, and that a detailed description of specific components and the spacing and size of the components is not necessary to obtain that understanding. Many of the individual components of the mass spectrometer are conventional in the industry, and accordingly are only schematically depicted. The foregoing disclosure and description of the invention are thus explanatory, and various details in the construction of the equipment are not included. Alternative embodiments and operating techniques will become apparent to those skilled in the art in view of this disclosure, and such modifications should be considered within the scope of the invention, which is defined by the following claims.

What is claimed is:

1. A system for analyzing a plurality of samples, comprising:

a plurality of portable sample supports each having a sample receiving surface thereon for accommodating a plurality of samples each at a fixed location on each sample support;

identification means for identifying each sample location of each of the plurality of samples on each of the plurality of sample supports;

a mass spectrometer for analyzing each of the plurality of samples on each sample support, the mass spectrometer having a sample receiving chamber therein for receiving each sample support;

a laser source for striking each sample on each sample support while within the receiving chamber with a laser pulse to desorb and ionize sample molecules;

support transfer mechanism for automatically inputting and outputting each of the sample supports from the sample receiving chamber of the mass spectrometer;

a powered mechanism movable in both an x direction and a y direction perpendicular to the x direction within the sample receiving chamber for supporting a respective sample support thereon;

a vacuum lock chamber connected to the sample receiving chamber of the mass spectrometer for receiving the sample supports and for maintaining one or more of the sample supports within a vacuum controlled environment while the plurality of samples on another of the sample supports are struck by laser pulses; and computer means for recording test data from the mass spectrometer for each of the plurality of samples on the sample supports as a function of the identification means.

2. The system as defined in claim 1, further comprising;

a sample loading mechanism for positioning each of a plurality of liquid samples on the sample receiving surface of each of the plurality of sample supports; and a curing chamber for drying each of the plurality of liquid samples on each of the sample supports to form a plurality of solid samples each positioned on a respective sample support.

3. The system as defined in claim 2, further comprising:

sample support positioning means for positioning each liquid sample on the sample receiving surface of a respective sample support.

4. The system as defined in claim 2, further comprising:

a sample preparation mechanism for automatically preparing each of the plurality of liquid samples for a deposit on a respective sample support.

5. The system as defined in claim 4, wherein the sample preparation mechanism includes a first plurality of containers for receiving respective dilutions and a second plurality of containers for receiving respective matrixes for preparing each of the plurality of liquid samples each containing a selected dilution.

6. The system as defined in claim 5, further comprising:

valve means responsive to the computer means for automatically controlling the flow of fluids from the first and second plurality of containers.

7. The system as defined in claim 1, further comprising:

a pump responsive to the computer means for pumping liquid samples to a respective one of the sample supports.

8. The system as defined in claim 7, further comprising:

a drying chamber for drying liquid samples on each of the sample supports to form dried samples.

9. The system as defined in claim 8, further comprising:

vacuum means for controlling a vacuum within the drying chamber in response to the computer means.

10. The system as defined in claim 1, wherein each of the plurality of portable sample supports comprises an electrically conductive sample plate having a plurality of predetermined sample positions on the sample receiving surface.

11. The system as defined in claim 10, wherein each of the plurality of predetermined positions on the sample plate includes a well for receiving a respective sample.

12. The system as defined in claim 11, wherein each of the plurality of wells on the sample plate are arranged in one of a plurality of rows and in one of a plurality of columns.

13. The system as defined in claim 1, wherein:

the identification means includes a marking on each sample support for identifying each of the plurality of samples on the sample receiving surface.

14. The system as defined in claim 1, wherein a sample support includes a magnetic handle for cooperating with the support transfer mechanism to position the sample support.

15. The system as defined in claim 1, wherein each of the plurality of sample supports includes a sample holder and a plurality of pins each removably positionable with respect to the sample holder, each of the plurality of pins having a sample receiving surface thereon for receiving a respective one of the plurality of samples.

16. The system as defined in claim 1, wherein each of the plurality of sample supports has one or more locating members for precisely positioning the sample support.

17. The system as defined in claim 1, wherein each of the sample supports comprises in excess of 80 determined sample positions on the sample receiving surface.

18. The system as defined in claim 1, further comprising:

sample support identification means for identifying each of the plurality of sample supports and for inputting sample support identification information to the computer means.

19. The system as defined in claim 1, further comprising:

a sample storage chamber for storing one or more of the plurality of sample supports; and a powered transporter for transporting each of the plurality of sample supports from the sample storage chamber to the vacuum lock chamber.

20. The system as defined in claim 19, wherein the powered transporter is automatically responsive to the computer means.

21. The system as defined in claim 19, further comprising:

a transport cassette for supporting a plurality of sample supports each in a preselected position within the sample storage chamber.

22. The system as defined in claim 21, further comprising:

a transport drive mechanism for selectively positioning the transport cassette within the sample storage chamber.

23. The system as defined in claim 22, wherein the transport drive mechanism is powered in response to the computer means.

24. The system as defined in claim 23, wherein the transport drive mechanism comprises a lead screw and a stepper motor.

25. The system as defined in claim 1, further comprising:

a door member for selectively controlling communication between the vacuum lock chamber and the sample receiving chamber of the mass spectrometer.

26. The system as defined in claim 25, further comprising:

a sample storage chamber for storing one or more of the plurality of sample supports; and another door member for controlling communication between vacuum lock chamber and the sample storage chamber.

27. The system as defined in claim 1, further comprising:

a pump for selectively evacuating the vacuum lock chamber.

28. The system as defined in claim 1, wherein:

each of the plurality of sample supports is moveable between the vacuum lock chamber and the receiving chamber of the mass spectrometer; and a transporter for moving one of the plurality of samples supports within the vacuum lock chamber while the plurality of samples on another of the sample supports are being struck with laser pulses.

29. The system as defined in claim 1, further comprising:

a powered sample support transporter for moving one or more of the plurality of sample supports within the vacuum lock chamber.

30. The system as defined in claim 1, further comprising:

a vent valve for selectively venting the vacuum lock chamber to atmospheric pressure.

31. The system as defined in claim 1, wherein the support transfer mechanism is responsive to the computer means.

32. The system as defined in claim 1, wherein the support transfer mechanism includes a fluid cylinder and an actuator rod extending between the fluid cylinder and a respective sample support.

33. The system as defined in claim 1, wherein:

each of the plurality of sample supports includes an electromagnet secured thereto; and power to each electromagnet is controlled in response to the computing means.

34. The system as defined in claim 1, wherein the x-y mechanism is an x-y table responsive to the computer means.

35. The system as defined in claim 1, further comprising:

an electrically conductive block within the sample receiving chamber for receiving a respective sample support; and one or more insulating members electrically insulating the powered positioning mechanism from the electrically conductive block.

36. The system as defined in claim 35, further comprising:

a securing mechanism for temporarily affixing the position of a respective sample support with respect to the electrically conductive block.

37. The system as defined in claim 1, further comprising:

an attenuator for adjusting the intensity of a laser beam output from the laser source.

38. The system as defined in claim 37, wherein the attenuator is responsive to the computer means.

39. The system as defined in claim 1, where the computer means interprets test data from the mass spectrometer.

40. A system for analyzing a plurality of samples, comprising:

a plurality of portable sample supports each having a sample receiving surface thereon for accommodating a plurality of samples each at a fixed location on each sample support;

sample identification means for identifying each sample location of each of the plurality of samples on each of the plurality of sample supports;

support identification means for identifying each of the plurality of sample supports; and a mass spectrometer for analyzing each of the plurality of samples on a respective one of the sample supports, the mass spectrometer having a sample receiving chamber therein for receiving a respective sample support;

a laser source for striking each sample on each sample support while within the receiving chamber with a laser pulse to desorb and ionize sample molecules;

support transfer mechanism for automatically inputting and outputting each of the sample supports from the sample receiving chamber of the mass spectrometer;

a vacuum lock chamber connected with the sample receiving chamber of the mass spectrometer for receiving each of the sample supports and for maintaining one or more of the sample supports within a vacuum controlled environment while the plurality of samples on another of the sample supports are struck by laser pulses;

a sample storage chamber for storing one or more of the plurality of sample supports;

a powered transporter for transporting each of the plurality of sample supports from the sample storage chamber to the vacuum lock chamber; and computer means for controlling the support transfer mechanism and for receiving information from the sample identification means and the support identification means for recording test data from the mass spectrometer for each of the plurality of samples on each of the sample supports.

41. The system as defined in claim 40 further comprising;

a sample loading mechanism for positioning each of a plurality of liquid samples on the sample receiving surface of each of the plurality of sample supports; and a curing chamber for drying each of the plurality of liquid samples on each of the sample supports to form a plurality of solid samples each positioned on a respective sample support.

42. The system as defined in claim 40, further comprising:

a pump responsive to the computer means for pumping liquid samples to a respective one of the sample supports.

43. The system as defined in claim 40, wherein each of the plurality of portable sample supports comprises an electrically conductive sample plate having a plurality of predetermined sample positions on the sample receiving surface.

44. The system as defined in claim 40, wherein:

the sample identification means includes a marking on each sample support for identifying each of the plurality of samples on the sample receiving surface.

45. The system as defined in claim 40, wherein a sample support includes a magnetic handle for cooperating with the support transfer mechanism to position the sample support.

46. The system as defined in claim 40, wherein each of the plurality of sample supports includes a sample holder and a plurality of pins each removably positionable with respect to the sample holder, each of the plurality of pins having a sample receiving surface thereon for receiving a respective one of the plurality of samples.

47. The system as defined in claim 40, wherein each of the plurality of sample supports has one or more locating members for precisely positioning the sample support.

48. The system as defined in claim 40, wherein each of the sample supports comprises in excess of 80 determined sample positions on the sample receiving surface.

49. The system as defined in claim 40, wherein the powered transporter is automatically responsive to the computer means.

50. The system as defined in claim 40, further comprising: a transport cassette for supporting a plurality of sample supports each a preselected position.

51. The system as defined in claim 50, further comprising:

a transport drive mechanism for selectively positioning the transport cassette within the storage chamber; and the transport drive mechanism being powered in response to the computer means.

52. The system as defined in claim 40, further comprising:

a door member for selectively controlling communication between the vacuum lock chamber and the sample receiving chamber of the mass spectrometer.

53. The system as defined in claim 52, further comprising:

another door member for controlling communication between vacuum lock chamber and the sample storage chamber.

54. The system as defined in claim 40, further comprising:

a powered sample support transporter for moving one or more of the plurality of sample supports within the vacuum lock chamber.

55. The system as defined in claim 40, wherein the support transfer mechanism includes a fluid cylinder and an actuator rod extending between the fluid cylinder and a respective sample support.

56. The system as defined in claim 40, wherein:

each of the plurality of sample supports includes an electromagnet secured thereto; and power to each electromagnet is controlled in response to the computing means.

57. The system as defined in claim 40, further comprising:

powered positioning mechanism for selectively positioning each of the plurality of sample supports within the sample receiving chamber.

58. The system as defined in claim 57, further comprising:

the powered positioning mechanism is an x-y table responsive to the computing means;

an electrically conductive block within the sample receiving chamber for receiving a respective sample support; and one or more insulating members electrically insulating the powered positioning mechanism from the electrically conductive block.

59. The system as defined in claim 40, further comprising:

an attenuator responsive to the computer means for adjusting the intensity of a laser beam output from the laser source.

60. A method of analyzing a plurality of samples within a sample receiving chamber of a mass spectrometer, the method comprising:

supporting each of a plurality of samples at a fixed location on one of a plurality of sample supports;

identifying each sample location of each of the plurality of samples on each of the plurality of sample supports;

providing a vacuum lock chamber for receiving the sample supports and for maintaining one or more of the sample supports within a vacuum controlled environment while the plurality of samples on another of the sample supports are struck by laser pulses;

automatically inputting and outputting each of the sample supports from the sample receiving chamber of the mass spectrometer to the vacuum lock chamber;

moving each sample support within the sample receiving chamber in both an x direction and a y direction perpendicular to the x direction;

striking each sample on each sample support while within the receiving chamber with a laser pulse to desorb and ionize sample molecules; and recording test data in a computer from the mass spectrometer for each of the plurality of samples on the sample support.

61. The method as defined in claim 60, further comprising;

positioning each of a plurality of liquid samples on the sample receiving surface of each of the plurality of sample supports; and drying each of the plurality of liquid samples on each of the sample supports to form a plurality of solid samples each positioned on a respective sample support.

62. The method as defined in claim 61, further comprising:

automatically preparing each of the plurality of liquid samples for deposit on a respective sample support.

63. The method as defined in claim 60, further comprising:

arranging each of the plurality of samples in each sample support in a plurality of rows and in a plurality of columns.

64. The method as defined in claim 60, wherein the step of identifying includes:

marking each sample support for identifying each of the plurality of samples.

65. The method as defined in claim 60, further comprising:

forming in excess of 80 predetermined sample positions on each of the respective sample supports.

66. The method as defined in claim 60, further comprising:

storing one or more of the plurality of sample supports within a sample storage chamber; and automatically transporting each of the plurality of sample supports from the sample storage chamber to the vacuum lock chamber in response to the computer.

67. The method as defined in claim 60, further comprising:

supporting each of the plurality of sample supports at a preselected position within a transport cassette.

68. The method as defined in claim 60, further comprising:

selectively positioning the transport cassette in response to the computer.

69. The method as defined in claim 60, further comprising:

controlling communication from within the vacuum lock chamber to the environment exterior of the vacuum lock chamber in response to the computer.

70. The method as defined in claim 60, further comprising:

moving a sample support with the vacuum lock chamber while the plurality of samples on another of the sample supports are being struck with laser pulses.

71. The method as defined in claim 60, further comprising:

controlling an x-y table in response to the computer for positioning the plurality of samples within the sample receiving chamber of the mass spectrometer.

72. The method as defined in claim 71, further comprising:

supporting each of the plurality of sample supports on an electrically conductive block within the sample receiving chamber; and electrically insulating the x-y table from the electrically conductive block.

73. The method as defined in claim 72, further comprising:

temporarily affixing the position of a respective sample support with respect to the electrically conductive block.

74. The method as defined in claim 60, further comprising:

adjusting the intensity of a laser beam output from the laser source in response to the computer.

* * * * *